Aug. 30, 1932.  F. SIEBER  1,873,984

INDICATING DEVICE

Filed Sept. 4, 1929

INVENTOR
FRITZ SIEBER
BY *Alfred H. Dyson*
ATTORNEY

Patented Aug. 30, 1932

1,873,984

UNITED STATES PATENT OFFICE

FRITZ SIEBER, OF BADEN, SWITZERLAND

INDICATING DEVICE

Application filed September 4, 1929, Serial No. 390,225, and in Germany September 14, 1928.

This invention relates to improvements in devices for measuring the pressure of gases and, particularly, to manometers which operate in dependence on the rate of heat transfer from a heated wire to a gas surrounding the wire, the pressure of which gas is to be measured.

It is well known that the rate of heat transference from a wire freely supported in a surrounding atmosphere or other surrounding gas is a function of the vapor density and that only a negligible quantity of heat flows by conduction along the wire itself. If the vapor density of the gas in which the hot wire is placed is increased, the rate of heat dissipation from the wire to the gas will be increased and the resistance of the wire to the flow of electric current will be decreased and vice versa. If a wire is, accordingly, electrically heated by means of a constant current, the amount of IR drop thereacross; which, of course, depends on the resistance of the wire; may be utilized as a measurement of the vapor density of the gas in which the wire is located.

The gas pressure surrounding the hot wire of such manometers may accordingly be read by the use of electrical measuring devices, such as voltmeters which measure the voltage in the wire or the voltage differences between several wires as a function of the pressure. The total load of such electrical measuring device is, however, very small, it being of the order of one milliwatt for manometers of the usual size. A rotating coil direct current electrical measuring instrument for such small load may be easily constructed in a convenient size but it is practically impossible to construct rotating coil alternating current direct reading instruments for fractions of a volt, for the reason that the load necessary for such instruments is at least one watt.

It is, therefore, among the objects of the present invention to provide a manometer of the hot wire type in which the heating current for the wire is taken from a source of alternating current and the indications are read on a gauge calibrated to indicate the pressure directly.

Another object of the invention is to provide a hot wire manometer in which alternating current supplies the manometer in such manner that the alternating current is used to measure the pressure without the necessity of supplying additional energy thereto.

Figure 1:
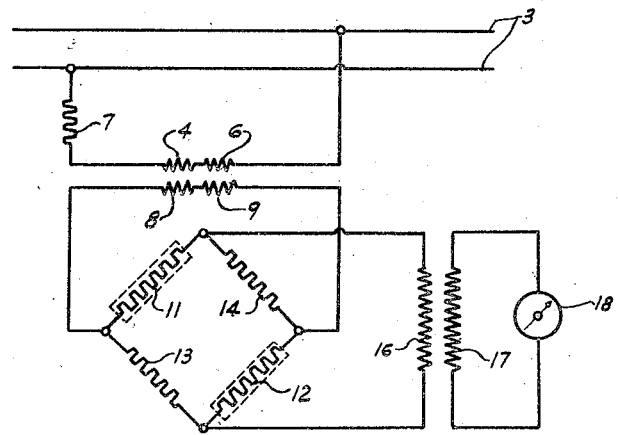

Objects and advantages, other than those above set forth, will be apparent from the following description, and the drawing in which Figure 1 shows an embodiment of the present invention in which an alternating current measuring instrument is utilized to indicate the degree of vacuum present in the chamber whereof the vapor density is to be determined.

Figure 2:
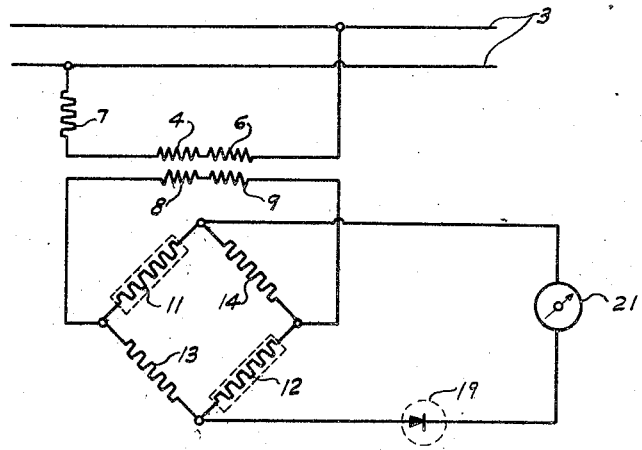

Fig. 2 shows a modified embodiment of the present invention in which the measuring device is supplied with alternating current and the pressure indications are read on a direct current measuring instrument.

Referring more particularly to the drawing by characters of reference, reference numerals 4, 8 indicate the primary and secondary windings respectively of a transformer which operates with a saturated core and 6, 9 indicate the primary and secondary windings respectively of a transformer which operates with a core having an air gap. As shown in the drawing, the primary windings 4, 6 are serially connected in circuit with a resistance 7 to line 3. The secondary windings 8, 9 are, however, connected in opposition to each other to thereby supply substantially a constant current to the Wheatstone bridge arms, hereinafter described, during periods of rise and fall of potential of line 3 within wide limits.

The current from the secondaries 8, 9 of the combined transformers is supplied to diagonally opposed points of a plurality of resistance wires 11, 12, 13 and 14 arranged in pairs in the form of a normally balanced Wheatstone bridge. Two of the wires or arms 11, 12 of the bridge are enclosed within the evacuated space, (as indicated by the dotted lines), in which the vapor density of the gas is to be measured and the other two arms 13, 14 of the bridge are supported in the atmosphere. The primary winding 16 of a second transformer is connected with the Wheatstone bridge arrangement of the resistance arms 11, 12, 13 and 14 at the junctions thereof not utilized for supplying current thereto from the secondaries 8, 9 of the combined transformers. The secondary 17 of the second transformer is connected with an alternating current measuring instrument 18.

The constant current supplied to the Wheatstone bridge arrangement by means of the resistance 7 and the combined transformers 4, 8 and 6, 9 is distributed through the pairs of arms 11, 12, 13 and 14 and heats the arms equally. Because of the fact that arms 11, 12 are, however, enclosed within a space wherein the density of the gases is different from that surrounding the arms 13, 14, the rate of heat dissipation from the arms 13, 14 is in direct relation to the difference between the vapor density of the gases surrounding the two pairs of arms. It is accordingly possible to calibrate the alternating current measuring instrument 18 in such manner that the vapor density surrounding the arms 11, 12 may be read directly therefrom.

Instead of utilizing the second transformer 16, 17, an electric current rectifying device 19 may be connected in the conductors leading from the Wheatstone bridge arrangement of the resistance arms which conductors will then include a direct current measuring instrument 21. The electric current rectifying device may be of any suitable construction, such as an oxide coated plate rectifier or a hot cathode tube as may be desired.

It will be apparent from the above description of the construction and operation of a hot wire pressure measuring device or manometer, that electrical measuring instruments having the smallest known energy requirements may be utilized as indicators in such manner that the primary load requirement is only a very small fraction of the amount necessary for the use of a load indicator. The alternating current measuring instrument 18 is suitably formed as an electro-static voltmeter. The energy requirements of such electro-static voltmeters is so small that only about 1/100 watt transformer losses need to be considered.

Although but two embodiments of this invention have been illustrated and described, it will be understood that various other embodiments are possible, and that various changes may be made without departing from the spirit of the invention or the scope of the claims.

The invention as claimed is:

1. In a system for measuring and indicating gas pressures, the combination comprising, a source of alternating current supply, a plurality of electrical resistance elements arranged and connected as a four armed closed Wheatstone bridge, two oppositely disposed only of said arms being arranged within the gas to be measured, serially connected transformers interconnecting said current supply and said elements at opposite nodal points of said bridge to effect the flow of a substantially constant current through said secondary windings and said elements, and indicating means connected with said bridge at the other opposite nodal points thereof and actuated responsively to the said supply current in dependence on the transfer of heat from said resistance elements resulting from flow of said current therethrough to the gas to be measured to indicate the pressure thereof.

2. In a system for measuring and indicating gas pressures, the combination comprising, a source of alternating current supply, a plurality of transformers, a primary winding and a secondary winding for each of said transformers, a current limiting resistance, said primary windings and said resistance being serially connected with said current supply, a plurality of electrical resistance elements arranged and connected as a four armed closed Wheatstone bridge, two oppositely disposed only of said arms being arranged within the gas to be measured, said secondary windings connected to said Wheatstone bridge at opposite nodal points thereof to effect a flow of substantially constant current through said secondary windings and said resistance elements, and a measuring instrument connected to the other opposite nodal points of said bridge actuated responsively to said supply current in dependence on the density of the gas to be measured to indicate the pressure thereof.

3. In a system for measuring and indicating gas pressures, the combination comprising, a source of alternating current supply, a plurality of transformers each including a primary winding and a secondary winding, an electrical resistance, said resistance and said primary windings being serially connected with said current supply, a plurality of resistance elements arranged and connected as a four armed closed Wheatstone bridge, two oppositely disposed only of said elements being arranged in the gas to be measured, the said secondary windings being connected to the said bridge at opposite nodal points thereof to effect flow of substantially constant current through said secondary windings and said bridge, a direct current measuring instrument and an electric valve serially connected with the said bridge at the other opposite nodal points thereof the said instrument being actuated responsively to the said supply current in dependence on the density of the gas to be measured to indicate the pressure thereof.

In testimony whereof I have hereunto subscribed my name this 13th day of August, A. D. 1929.

FRITZ SIEBER.